May 16, 1967  K. HÄRTL  3,319,552
PHOTOGRAPHIC SHUTTER FOR SINGLE LENS REFLEX CAMERAS
Filed March 1, 1965  2 Sheets-Sheet 2
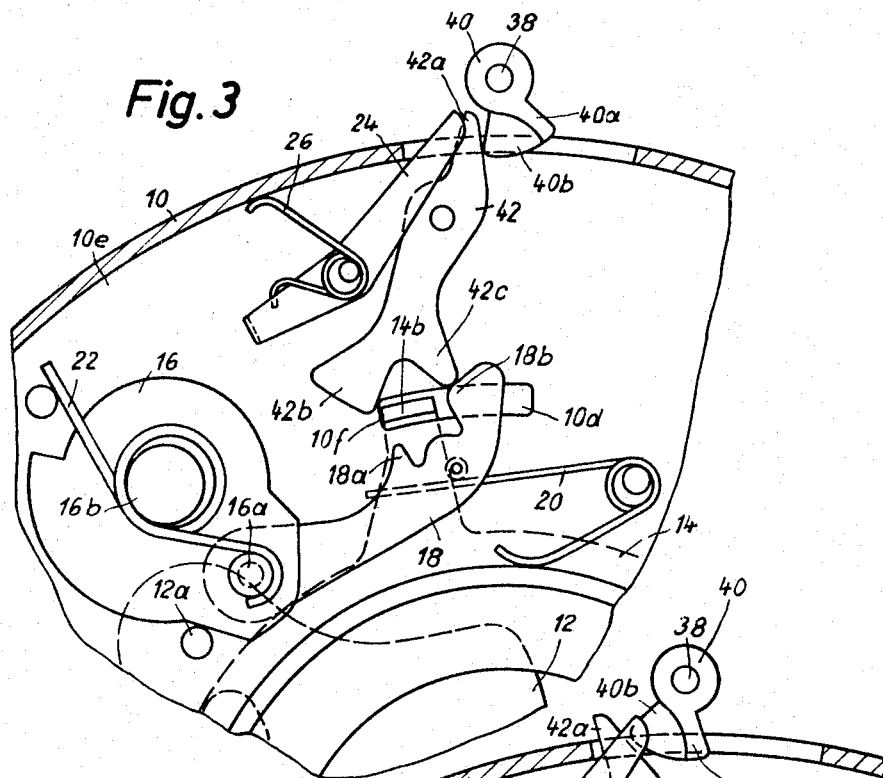
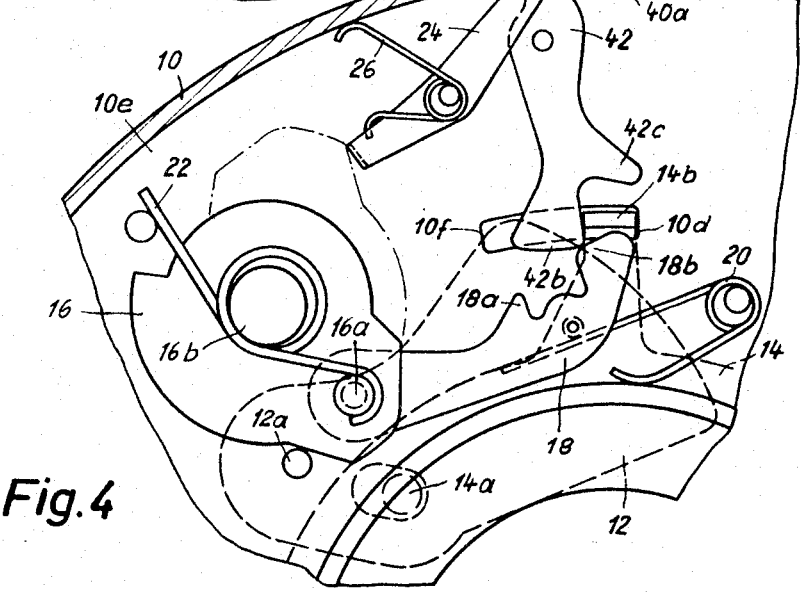

_United States Patent Office_

3,319,552
Patented May 16, 1967

3,319,552
PHOTOGRAPHIC SHUTTER FOR SINGLE LENS REFLEX CAMERAS
Karl Härtl, Munich, Germany, assignor to Compur-Werk Gesellschaft mit beschrankter Haftung & Co., Munich, Germany, a firm of Germany
Filed Mar. 1, 1965, Ser. No. 436,244
Claims priority, application Germany, Mar. 6, 1964, C 11,515
2 Claims. (Cl. 95—42)

ABSTRACT OF THE DISCLOSURE

A shutter for a single lens reflex camera having mechanism to open the shutter blades to permit interim inspection between camera exposures. The mechanism includes a pivoted opening member having an end portion engageable with a cam mounted on the shaft which operates the reflector. The opening member has a second end portion including a pair of projections, one projection disengaging the blade driving ring from the driving means and the other projection moving the blade ring to a shutter open position when the cam pivots the opening member.

The present invention relates to a photographic shutter for a single lens reflex camera and more specifically to the mechanism utilized to open the shutter blades to permit interim inspection between camera exposures. The mechanism according to the present invention includes an opening member which is controlled by the means which operates the reflector, the opening member being pivoted within the shutter housing and engageable with the blade driving ring.

Heretofore there have been provided mechanisms in single lens reflex cameras which open the shutter for interim inspection but such mechanisms lacked the simplicity of construction of the present invention and required more space within the shutter housing. The present invention achieves the desired purpose with a minimum number of parts, requires a small amount of space within the camera housing and is in direct engagement with the mechanism for actuating the camera reflector.

According to the present invention there is provided an opening member which is pivoted within the shutter housing. This member has one arm which projects out of the shutter housing and cooperates with a cam coupled to the reflector drive means. The other arm of this member is disposed within the shutter housing and has projections engageable with the blade driving means for opening the shutter blades for interim inspection. The cam coupled to the reflector drive means is mounted on a shaft disposed parallel to the optical axis of the camera and mounted externally of the shutter housing. A second cam is mounted on this same shaft and this cam cooperates with an end portion of the shutter trip lever which projects from the shutter housing.

An object of the present invention is to provide a mechanism for opening a shutter of a single lens reflex camera for interim inspection, the mechanism being in direct engagement with the reflect or operating means.

Another object of the present invention is to provide a blade operating mechanism for a single lens reflex camera which is relatively simple in construction and occupies a small amount of space in a shutter housing.

Figure 1:
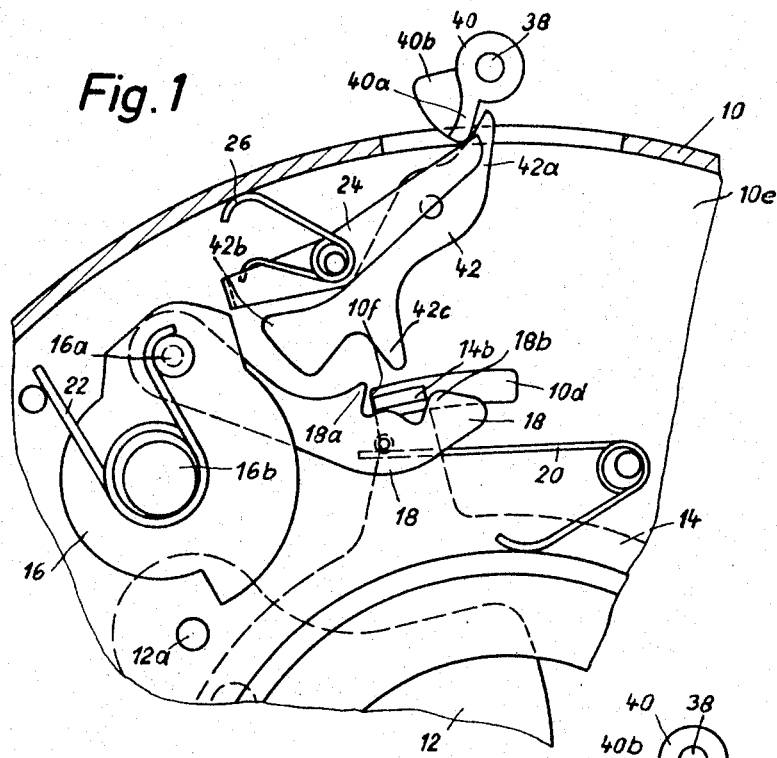
Figure 2:
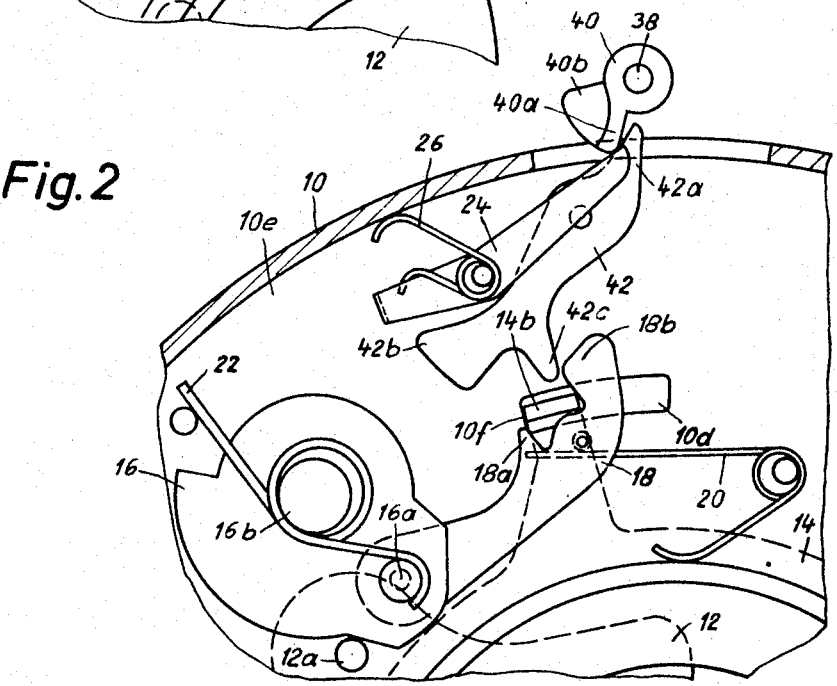

Other objects and many of the attendant advantages of the present invention will become more readily apparent upon consideration of the following detailed specification in connection with the accompanying drawings wherein:

FIGURE 1 is a plan of the shutter with the front plate removed and with the main driving member released to trip the shutter, FIGURE 2 shows this shutter in the rundown condition immediately after a photograph has been taken, FIGURES 3 and 4 show the shutter before and after the shutter opening procedures have been performed to allow an interim inspection.

The shutter illustrated is a blade shutter of known construction with the mechanism installed in a shutter housing 10. There are, for example, five shutter blades 12, and only one of these has been illustrated in the interests of simplicity; each blade is pivotally mounted at 12a and is given a reciprocatory motion, so as to open and close the objective aperture, by means of a driving pin 14a (FIGURE 4) of a blade driving ring 14. The blade driving ring is in turn moved by a main driving member 16 and a crank 18 which is pivotally coupled to the driving member by a pin 16a, this crank cooperating with the upturned end of an arm 14b of the blade driving ring 14. The arm 14b of the blade driving ring 14 passes through a slot 10d of the base plate 10e in the forward direction and bears in its rest position against an abutment 10f in the slot 10d. The crank 18 has two abutment faces 18a and 18b, and the spring 20 urges the crank 18 into engagement with the arm 14b of the blade driving ring 14. The main driving member 16 is mounted on a cocking shaft 16b which projects rearwardly from the shutter housing and a driving spring 22 is mounted on the shaft which spring biases the main driving member in the clockwise direction.

In the cocked condition which is indicated in dotted lines in FIGURE 4, the main driving member is held stationary by a trip lever 24, the trip lever being retained by the action of a spring 26.

In view of the fact that the shutter is intended for use with a single lens reflex camera with immediate reflector return, it has an additional device to open the same for interim observation of the image. This opening device is operated by a shaft 38 which is mounted externally of the shutter housing and is disposed in the camera, and shaft 38 is coupled to the camera gear for controlling the reflector. Mounted fixedly on the shaft 38 is a sleeve 40 having two radial operating cams 40a and 40b disposed in different planes. The first cam 40a of this sleeve cooperates with the shutter trip lever 24, while the second cam 40b coacts with an arm 42a of a double-armed opening lever 42 which is pivotally mounted in the housing for free rotation, that is to say without a restoring spring. The other arm 42b and the projection 42c of the lever 42 cooperate with the arm 14b and with crank 18 of the blade driving ring 14.

The arrangement described works as follows:

In FIGURE 4 the shutter blades 12 are in the opened condition for an interim inspection, the main driving member 16 assumes its cocked position, indicated in dotted lines, after the cocking action has taken place. The blades must be returned from this opened condition to the closed condition before an exposure can be made. This is affected by operating the camera trip (not shown) as a result of which the gear on the camera (also not shown) allows the shaft 38 and the sleeve 40 to run down from the FIGURE 4 position in the counter clockwise direction. At the commencement of this rundown movement the cam piece 40b moves further and further towards disengagement with the arm 42a of the opening lever 42, so that after the engagement has been fully broken, the blade driving ring 14 can return to the closure position of FIGURE 1 under the action of a return spring (not shown), thereby to close the blades. The arm 42b and the projection 42c have also released the crank 18 so that it remakes contact with the arm 14b of the blade driving ring 14. During the further rundown movement of the shaft 38 in the counterclockwise direction (from the position illustrated in FIGURE 4 into that illustrated in FIGURE 1), which movement spans an angular travel of about 320°, the reflector and, where used, the film cover flap, are swung up. At the end of the aforesaid rundown movement of the shaft 38, the cam piece 40a makes contact with the trip lever 24, as a result of which the trip lever is turned in the clockwise direction to release the main driving member 16 so that it can run down into its rest position (FIGURE 2).

The actual exposure procedure is now performed by opening and closing the shutter blades in a manner which is known and is not therefore here described in any detail.

As already explained, since the present invention relates to a camera with immediate reflector return, the opening shaft 38 and sleeve 40 turn in the opposite direction immediately after a photograph has been taken, that is to say, in the clockwise direction from the position of FIGURE 1 back to the position illustrated in FIGURE 4. In the course of this movement the reflector, and the film cover flap, where used, are again pivoted until the cam piece 40b finally engages the arm 42a of the opening lever 42, the latter being positively pivoted in the counter clockwise direction. The projection 42c of the lever arm 42b makes contact with the abutment face 18b of the crank 18 whereby the latter is turned in the clockwise direction and disengaged from the arm 14b of the blade driving ring. When this engagement is broken, the arm 42b of the opening lever 42 also engages the arm 14b, whereby the blade driving ring 14 moves into the position in which the blades are open, and is held in this position (FIGURE 4).

During this opening movement of the blade driving ring 14, the inner surface of its arm 14b, which faces the center of the shutter, slides over the crank face 18b as a result of which the crank 18 is turned further in the clockwise direction. In the meantime the projection 42c has withdrawn from engagement with the crank face 18b into the position seen in FIGURE 4.

To enable a further photograph to be taken, it is now only necessary to cock the shutter, by turning the main driving member 16 through the agency of its shaft 16b; this shaft may for example be coupled to the film feed and reflex control gear of the camera in known fashion.

I claim:

1. In a single lens reflex camera having a reflector actuating means, a shutter housing, an opening member pivotally mounted in said shutter housing, said opening member having a pair of arms, one of said arms extending out of the housing, a shaft disposed parallel to the shutter axis and outside said shutter housing, said shaft being coupled to the reflector actuating means, a first cam mounted on said shaft and engageable with said one arm, a shutter trip lever pivotally mounted in the housing and having an end portion projecting out of the shutter housing, a second cam mounted on said shaft, said second cam adapted to cooperate with the projecting end portion of the shutter trip lever, shutter blades pivotally mounted in said housing, a blade driving means movable in said housing for the purpose of opening and closing said blades, the other arm of said opening member disposed in the housing and cooperating with the blade driving means for the purpose of disengaging said blade driving means and for moving the blades into open position for interim inspection upon rotation of said shaft and first cam.

2. In a single lens reflex camera of the class described comprising, in combination, a shutter housing, a plurality of shutter blades pivotally mounted in said housing, a blade driving ring rotatably mounted in said housing and operatively connected with said blades, a main driving member mounted in said housing and a crank arm pivoted on said main driving member and engageable with said blade driving ring for rotating said driving ring in a direction for opening said blades and in an opposite direction for closing said blades, an opening lever pivotally mounted in said housing, a first end of said lever extending outwardly of the housing, first cam means mounted externally of said housing and operatively associated with the first end of the lever, a second end of said lever disposed within the housing and having a pair of abutment projections, one of said projections adapted to engage said crank arm and to disengage the crank arm from engagement with the driving ring and the other of said projections adapted to engage the driving ring to move said blade driving ring in said direction for the purpose of opening the shutter blades for interim inspection when said first cam means is actuated to pivot the opening lever, and further including a trip lever pivoted in said housing and engageable with said main driving member and a second cam means mounted externally of said housing and operatively associated with the trip lever, a shaft mounting said first and second cam means, rotation of said shaft causing sequentially actuation of the opening lever to open and close the shutter for interim inspection and actuation of the trip lever to make the exposure.

References Cited by the Examiner

UNITED STATES PATENTS

| | | | |
|---|---|---|---|
| 2,926,575 | 3/1960 | Gebele | 95—42 |
| 3,122,078 | 2/1964 | Singer | 95—42 |
| 3,122,081 | 2/1964 | Singer | 95—63 |
| 3,242,838 | 3/1966 | Singer | 95—42 |

JOHN M. HORAN, *Primary Examiner.*